(12) United States Patent
Garcia

(10) Patent No.: US 9,289,744 B2
(45) Date of Patent: *Mar. 22, 2016

(54) IRRADIATION SOURCES AND METHODS

(71) Applicant: American Ultraviolet West, Inc., Torrance, CA (US)

(72) Inventor: Andrew Garcia, Lomita, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/686,793

(22) Filed: Nov. 27, 2012

(65) Prior Publication Data

US 2013/0292583 A1 Nov. 7, 2013

Related U.S. Application Data

(63) Continuation of application No. 12/144,279, filed on Jun. 23, 2008, now Pat. No. 8,319,199.

(51) Int. Cl.
| | |
|---|---|
| *G21K 5/04* | (2006.01) |
| *B01J 19/12* | (2006.01) |
| *B05D 3/06* | (2006.01) |
| *F26B 3/28* | (2006.01) |
| *H05B 3/00* | (2006.01) |

(52) U.S. Cl.
CPC ............... *B01J 19/123* (2013.01); *B05D 3/067* (2013.01); *F26B 3/28* (2013.01); *H05B 3/0057* (2013.01)

(58) Field of Classification Search
USPC ........ 250/493.1, 494.1, 503.1, 504 R, 504 H; 422/1, 20, 21, 22, 24; 362/109, 119, 362/120

See application file for complete search history.

(56) References Cited

U.S. PATENT DOCUMENTS

| | | | |
|---|---|---|---|
| 4,669,033 A | 5/1987 | Lee | |
| 4,786,812 A * | 11/1988 | Humphreys | ............. 250/455.11 |
| 6,000,815 A | 12/1999 | Jennings | |
| 6,361,194 B1 | 3/2002 | Evans et al. | |
| 6,520,663 B1 | 2/2003 | Holmes et al. | |
| 6,599,585 B2 | 7/2003 | Blacker, Jr. et al. | |

(Continued)

OTHER PUBLICATIONS

Uvitron International, Inc., Porta-Ray 400R Portable UV Curing system UV1197 / UV1198, Oct. 2, 2006, 2 Pages, West Springfield, MA 01089 USA.

*Primary Examiner* — Nicole Ippolito
(74) *Attorney, Agent, or Firm* — Henricks, Slavin & Holmes, LLP

(57) ABSTRACT

Irradiating assemblies can have a housing with a reflector extending linearly parallel to a lamp. Radiation can be emitted from one opening, for example in a bottom portion of the housing, as well as from another opening, for example a side opening in the housing. Irradiating assemblies can also have first and second reflector portions at angles with respect to each other wherein radiation is reflected out of a housing that does not have an end reflector. Irradiating assemblies can be configured to have cooling flow openings in side walls so that cooling fluid such as air can flow between the side walls and adjacent surfaces of a reflector. Irradiating assemblies can incorporate lamps having first and second electrodes wherein the first and second electrodes are oriented at an angle with respect to each other. Methods of irradiating material may include irradiating a surface with emissions from a first portion of an assembly and irradiating a surface with emissions from a second portion of an assembly different from the first portion.

21 Claims, 9 Drawing Sheets

(56) References Cited

U.S. PATENT DOCUMENTS

| | | |
|---|---|---|
| 6,672,729 B1 | 1/2004 | Schaefer |
| 6,776,790 B1 | 8/2004 | Maruyama et al. |
| 7,731,379 B2 | 6/2010 | Wakalopulos |
| 8,319,199 B2 * | 11/2012 | Garcia ............ 250/494.1 |
| 2001/0004320 A1 | 6/2001 | Wood |
| 2004/0165391 A1 | 8/2004 | Blacker, Jr. et al. |
| 2008/0094460 A1 | 4/2008 | Nakata et al. |
| 2009/0273936 A1 | 11/2009 | Wakalopulos |

* cited by examiner

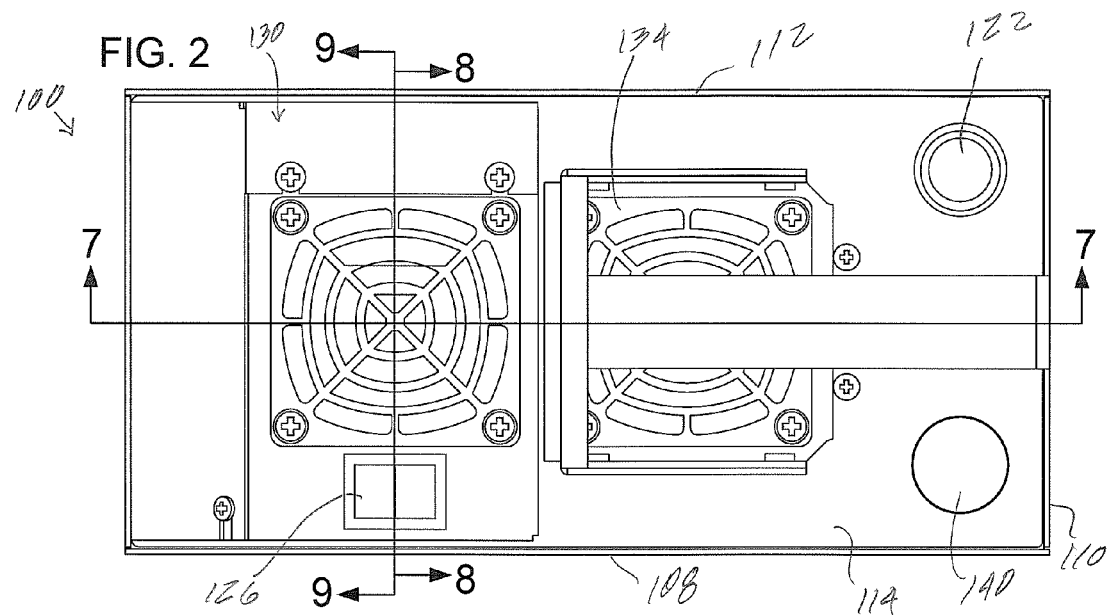
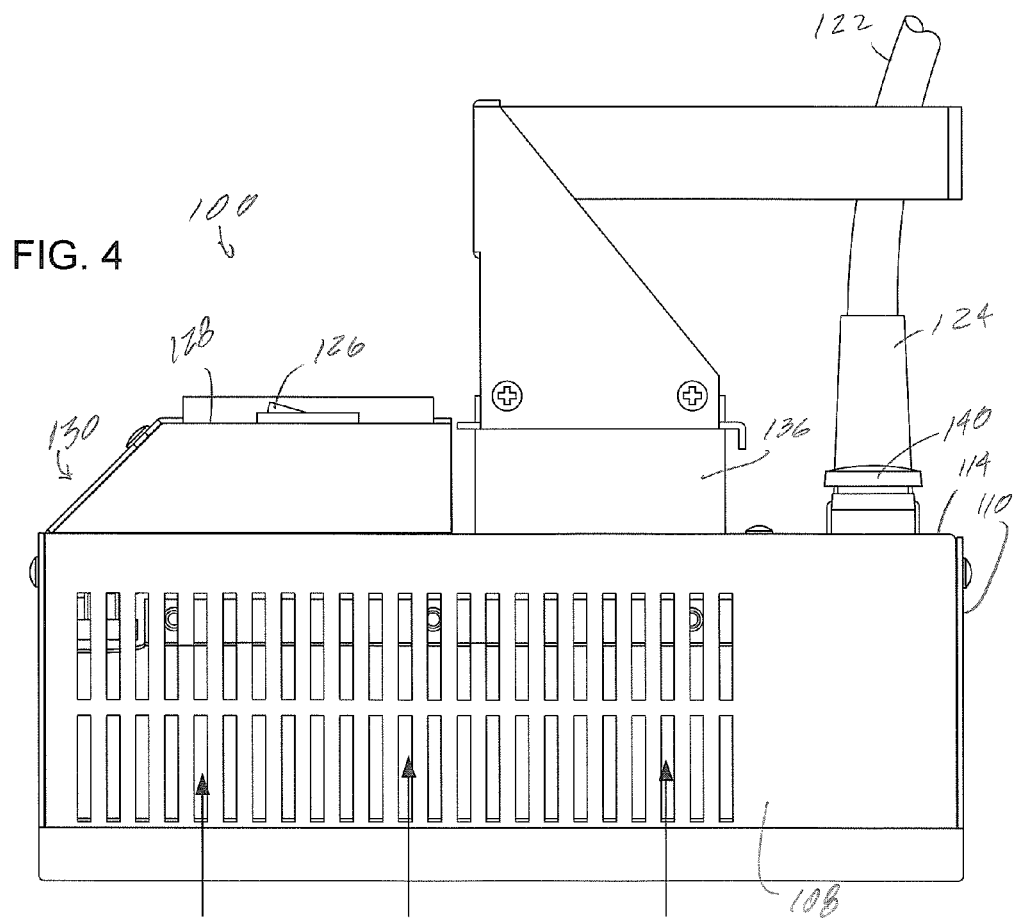

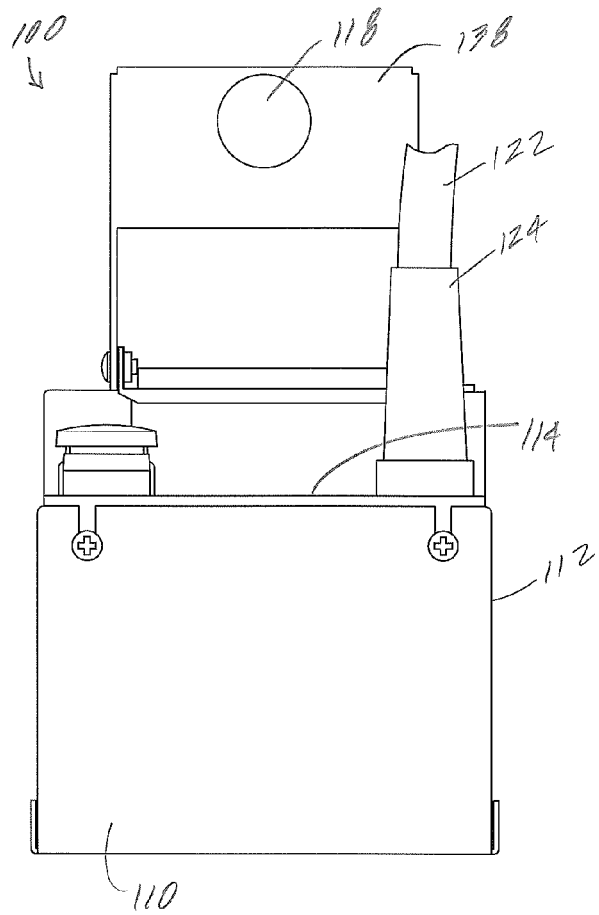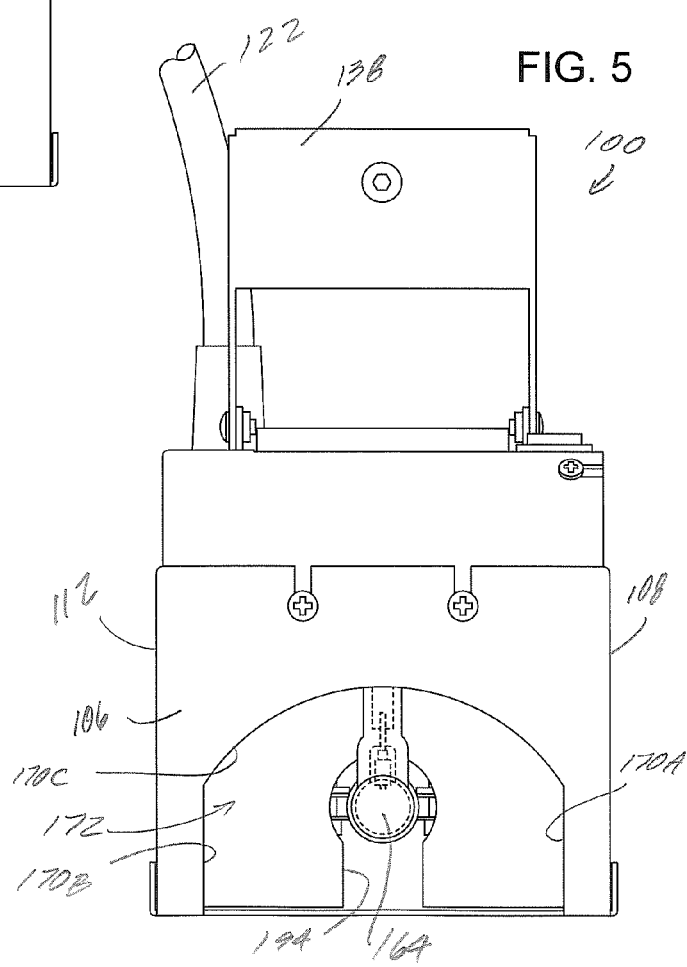

IRRADIATION SOURCES AND METHODS

CROSS REFERENCE TO RELATED APPLICATIONS

This is a Continuation of Ser. No. 12/144,279, filed Jun. 23, 2008, now U.S. Pat. No. 8,319,199.

BACKGROUND

1. Field

These inventions relate to irradiation devices and methods, including for example, UV curing apparatus and methods and hand-held UV curing apparatus and methods.

2. Related Art

UV curing apparatus and methods are used for curing photo-initiated adhesives and other coating compositions. UV radiation curing offers significant energy and savings compared to thermal curing in heat ovens. UV radiation curing also is much quicker with significant time savings, and is more environmentally friendly in reducing toxic emissions. Another advantage of UV curing is the adhesives leave behind no solvent residue, as is common with thermoplastic adhesives which set upon cooling or evaporation of a solvent. U.S. Pat. No. 6,000,815, and U.S. published patent publication U.S. 2004/0165391, each discuss irradiation lamp assemblies. The descriptions and drawings of those documents are incorporated herein by reference.

In these apparatus, the lamp source is positioned inside the reflector so that UV radiation produced by the lamp source when energized irradiates the target surface or material. Part of the radiation is emitted directly from the lamp source toward the target, while part of the radiation is focused onto the target by the reflector. Any focus on the target depends on the reflector configuration, the lamp source configuration and its orientation relative to the reflector.

Existing lamps generally have a single mode of operation. For example, a linear lamp source combined with a longitudinally extending reflector can be used to produce a line of radiation for curing material. The assembly, for example, can be used to cure a coating on a wall, such as by passing the assembly back and forth over the surface. Substantially all of the coating on the surface can be cured in this way, but curing surface coatings in a corner of two adjacent walls or in a corner between two walls and a floor or ceiling may be more difficult. The ease of curing surface coatings in a corner of two adjacent walls will depend on the resolution or how fine the beam of radiation is from the assembly. With a finely focused beam, a corner area can be cured without inadvertently over-irradiating adjacent surface material.

In a corner between two adjacent walls and a floor or a ceiling, it is more difficult to cure the corner material without over-irradiating the adjacent surface material. For example, because the corner is an intersection of three surfaces rather than two surfaces, irradiation from a linear beam for a given lamp assembly extends not only into the corner but also along adjacent wall surfaces. As a result, the adjacent wall surfaces may get more radiation than the corner before the corner surfaces are properly cured. Additionally, equipment design is such that equipment parts such as housing components, reflector parts and the like extend around the sides of the lamp source, making it more difficult to place the lamp source as close to the surface as may be desired for adequate curing.

When the lamp source produces radiation, the lamp source temperature increases and generally requires cooling for the desired continued operation. Additionally, radiation reflection from the reflector raises the reflector temperature, which should also be cooled. In one configuration, one or more fans draw outside cooling air into the reflector trough and around the irradiation lamp source, thereby cooling both.

SUMMARY

Methods and apparatus are disclosed that make it easier and more efficient to irradiate materials, for example using UV radiation. The methods and apparatus are well-suited for hand-held equipment, and one or more aspects of the methods and apparatus can be applied to larger equipment and larger applications. In some configurations, the apparatus and the use of the apparatus is more versatile, and in some configurations can have multiple modes of operation. In other configurations, the equipment can be configured to allow placement of the radiation source closer to the target, as well as to allow more uniform irradiation of the target. Additional configurations give improved cooling and ventilation for the equipment.

In one example of a radiation assembly, for example that can be used as described herein, the assembly includes a housing with a radiation source within the housing. In one example, the radiation source is a UV lamp source for producing UV radiation. The housing has least one opening for allowing radiation outside the housing. A reflector in the housing includes at least first and second portions and a first portion is parallel to a portion of the radiation source, such as the lamp source, and a second portion non-parallel to the radiation source. In one example, the reflector includes a first end portion that is open and adjacent an opening in the housing. In such an example, the first end portion can be at the end of the reflector that is parallel to the radiation source and the end portion terminates at an opening, in one configuration at a longitudinal end of the radiation source. Additionally, the second reflector portion non-parallel to the radiation source can be at a position relative to the radiation source opposite the opening.

In another example of a radiation assembly, for example that can be used as described herein, a UV lamp source can be positioned in a housing with a reflector to produce UV radiation emitted through an opening in the housing. For example, the UV lamp source can be a linear UV lamp source positioned adjacent a longitudinally-extending reflector having a portion extending parallel to the UV lamp source. One end portion of the reflector may be uncovered and adjacent a housing opening that allows radiation to be emitted substantially parallel to the UV lamp source. A second reflector portion may be positioned non-parallel to the lamp source, for example to reflect radiation out the housing opening in a direction of an axis of the lamp source, for example a longitudinal axis. In one example, the UV lamp source extends longitudinally, substantially parallel to a reflector trough, opposite a first opening, from a first lamp source end portion adjacent a non-parallel reflector to a second lamp source end portion adjacent a second opening in the housing. Radiation is emitted through the first opening from the lamp source and reflected from the trough, and radiation is also emitted through the second opening from the lamp source and also reflected from the non-parallel reflector. In this example, the second opening has no reflector at the end of and perpendicular to lamp source. The reflector trough is substantially uniform along the length of the reflector from the non-parallel reflector to the open end. In one example, the reflector trough may conform to a partial ellipse, and the second opening may also conform to a partial ellipse. Radiation reflected from the non-parallel reflector can be directed along the axis of the lamp source and out the second opening.

In a further example of an irradiation assembly, for example that can be used as described herein, a UV lamp source can be positioned in a housing with a reflector to produce UV irradiation emitted through an opening in the housing. The UV lamp source may include a linear portion having a first electrode extending substantially parallel to the linear portion, and a second electrode substantially perpendicular or non-parallel to the linear portion. The non-parallel electrodes allow at least one portion of the lamp source to be positioned close to the outer envelope of the assembly, thereby allowing positioning of part of the lamp source closer to the target surface. They also allow more flexibility in positioning the lamp source within the housing. In one example, the second electrode substantially perpendicular to the linear portion of the lamp source is adjacent a side opening of the assembly. Having the second electrode perpendicular to the rest of lamp source rather than parallel to the lamp source eliminates or reduces a radiation shadow experienced with linear lamp sources having electrodes parallel to the lamp source. Therefore, the irradiance through a side opening at the target may be improved.

In another example of an irradiation assembly, the UV lamp source is provided in a housing and extends linearly within housing. A reflector is included within the housing and includes a linear portion extending linearly with the UV lamp source for reflecting UV radiation. The housing includes a first opening in a bottom portion and a second opening in a side portion such that UV radiation can exit the housing through the first opening or through the second opening. With such a configuration, the assembly can have dual modes, and in one application radiation through the opening in the bottom portion easily cures coatings on relatively flat surfaces and radiation through the opening in the side portion can cure coatings in corners. In one example of the foregoing configuration, the reflector can have elliptical features, such as may be produced by combining two quarters of an ellipse, for example two symmetrical reflector portions. The first and second opening can be oriented perpendicular relative to each other. The first opening can be substantially rectangular around the edge of an elliptical trough reflector, and the second opening can be a substantially partial ellipse formed in the housing corresponding approximately to the profile of the reflector. This example of an irradiation assembly is also suited for use with a lamp source wherein the electrodes are oriented non-linearly with respect to each other, for example where one electrode is perpendicular to a central axis of the lamp source.

In an example of using an irradiation assembly, including for example irradiation assemblies described herein, a UV irradiation lamp assembly is positioned to direct UV radiation toward a surface, for example a surface to be cured. The surface is irradiated with UV radiation that is emitted from a first portion of the assembly. The assembly can also be positioned to direct UV radiation toward a surface from a second portion of the assembly, and irradiating the surface with radiation emitted from the second portion of the assembly. In this method of use, more than one mode of irradiating a surface is used. The method can be used to cure more than one type of surface configuration. In one process, a surface can be irradiated while passing the assembly across the surface, for example through radiation emitted through the first portion of the assembly, and/or the second portion of the assembly. Radiation emitted from the first portion of the assembly can be used to cure one surface configuration, for example flat walls or large surfaces, and also to cure another surface configuration, for example corners or intersections of surfaces. In a further example, radiation can be emitted through the first and/or second portions of the assembly after being reflected from one or more reflector portions.

In any of the examples described herein, a handle can be included that can be used to easily support and manipulate the irradiation assembly. The handle can be positioned on the apparatus to make easier use of the apparatus in several different modes. In one example of the use of a handle on an irradiation assembly, the handle can be used to move the assembly over a wall surface in one orientation, and to direct radiation into a corner using another orientation. Hand-held radiation assemblies can benefit from one or more of the elements described herein.

Also in any of the examples described herein, openings may be formed in one or more housing walls to allow air or other fluid to flow through the openings and between a portion of the reflector and the housing. In examples where the reflector includes a longitudinally extending reflector wall, openings may be included in a housing wall adjacent the longitudinally extending reflector wall, so that air can flow between the reflector wall and the adjacent housing wall. In one example, openings can be formed in longitudinal side walls of the housing so that air can flow over substantially the entire non-reflective side of the reflector and substantially over the entire longitudinal length. Where the housing walls can be considered to extend vertically, at least half of the height of a housing wall can be occupied by an opening, and openings can be distributed over an entire longitudinal length of a housing wall. The openings can be distributed over the housing wall both height-wise and longitudinally, as well as other distributions. In one example, the openings are substantially equally spaced apart, and each has substantially the same cross-sectional area as another. Powered devices such as fans can be used to force air flow for cooling.

These and other examples are set forth more fully below in conjunction with drawings, a brief description of which follows.

BRIEF DESCRIPTION OF THE DRAWINGS

FIG. 2 is a top plan view of the assembly of FIG. 1.

FIG. 3 is a rear elevation view of the assembly of FIG. 1.

FIG. 4 is a left side elevation view of the assembly of FIG. 1.

FIG. 5 is a front elevation view of the assembly of FIG. 1.

FIG. 13 is a rear elevation view of the lamp source of FIG. 11.

DETAILED DESCRIPTION

Figure 1:
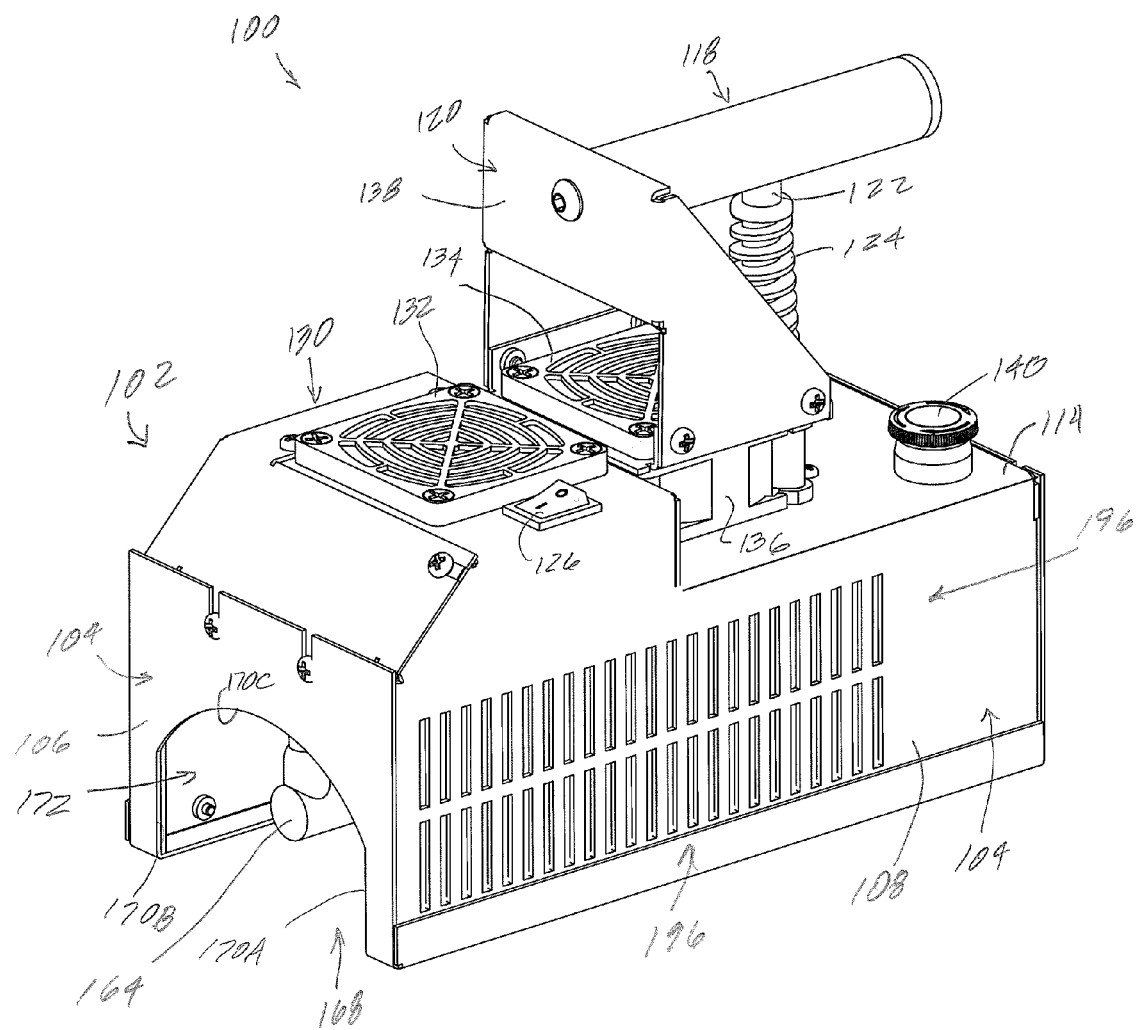
FIG. 1 is an upper left isometric view of an irradiation assembly in accordance with one example described herein.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of irradiation sources and of methods of making and using the irradiation sources are described. Depending on what feature or features are incorporated in a given structure or a given method, benefits can be achieved in the structure or the method. For example, irradiation sources with openings facing in different directions may provide more flexibility in use and application. They may also be more efficient during use. Additionally, irradiation sources may be configured to have improved cooling, such as more uniform cooling. Novel configurations may also be easier to manufacture.

These and other benefits will become more apparent with consideration of the description of the examples herein. However, it should be understood that not all of the benefits or features discussed with respect to a particular example must be incorporated into an irradiation source, component or method in order to achieve one or more benefits contemplated by these examples. Additionally, it should be understood that features of the examples can be incorporated into an irradiation source, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of irradiation source configurations and of methods of making and using the irradiation sources are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results. Handheld irradiation sources are used as examples of an apparatus that can incorporate one or more of the features and derive some of the benefits described herein. However, other irradiation sources can benefit from one or more of the present inventions.

It should be understood that terminology used for orientation, such as front, rear, side, left and right, upper and lower, and the like, are used herein merely for ease of understanding and reference, and are not used as exclusive terms for the structures being described and illustrated.

Considering irradiation sources and methods in more detail, one example of an irradiation source in the form of a UV curing irradiation source 100 (FIGS. 1-9) is shown as a hand-held irradiation source. Hand-held irradiation sources are generally smaller, easier to manipulate and manually position or move as desired, compared to high-volume irradiation sources such as may be used in manufacturing or the like. Even though the discussion herein will concentrate on hand-held irradiation sources, it should be understood that one or more of the features and concepts described with respect to the exemplary irradiation source may also be applied to other irradiation sources, including fixed or stationary sources and those used on production lines.

The UV curing irradiation source 100 generally includes a body 102 having a housing indicated generally at 104 enclosing or extending around various internal components. Generally, the body is formed by assembly of various housing components into a complete assembly. In the present example of the hand-held irradiation source, the housing includes a front wall 106, a left side wall 108, a back or rear wall 110, a right side wall 112 (FIGS. 3 and 5) and an upper housing wall 114 (FIGS. 1-4). A bottom housing wall 116 (FIG. 6) extends along the bottom of the assembly and forms a base for placing the assembly on a support surface, for example when not in use. A handle 118 (FIGS. 1-5 and 7-8) is supported directly or indirectly by the upper housing wall 114, for example through a handle mounting bracket 120. The handle 118 allows reliable holding of the radiator and easy manipulation of the assembly to a desired orientation, for example for curing a material, irradiating a surface or the like. The reference terminology to front, left, rear, right, and upper and bottom housing walls are used for ease of orientation and understanding the description herein, and are not used by way of limitation. These terms are used relative to the handle position and orientation so that a user would hold the assembly by the handle 118 with the front wall 106 facing outward, and the upper housing wall 114 facing upward. However, the orientation of the assembly is not limited to that shown in FIG. 1, especially with hand-held irradiation sources that are intended to be moved and oriented in different directions for curing or otherwise irradiating materials. Additionally, for those assemblies intended be fixed rather than hand-held or portable, the particular orientation will typically be fixed during normal operation though not necessarily the same orientation as represented in FIG. 1.

The UV curing source 100 generally includes a power supply, in the present example a power cord 122 supported by a strain relief 124 fixed or otherwise mounted to the upper housing wall 114. The power cord 122 supplies power for energizing the UV curing lamp source (described below) upon activation of an on-off or power switch 126 (FIGS. 1-2 and 4). The power switch 126 in the present example is mounted to an upper surface 128 of a component housing 130 above the upper housing wall 114. The component housing 130 houses the power switch 126 and its associated wires, and also houses at least one cooling fan 132 or other powered flow device to help in cooling components of the UV curing source. The component housing 130 also houses wires used to power the fan 132. In the present example, a second fan 134 is supported on the upper housing wall 114 through a fan housing 136 (FIGS. 1 and 4). The fans can be configured to push cooling air through the housing or pull air for cooling. The fan housing also supports the handle bracket 120 on the upper housing surface 114. The fan housing can support handle bracket 120 such that a handle mounting plate 138 on the bracket is positioned above a forward portion of the second fan 134. In this configuration, most if not all of handle is positioned above the upper housing wall 114 and the handle mounting plate 138 is approximately over the center of mass of the assembly. Alternatively, the handle bracket 120 can be reversed 180 degrees so that the handle mounting plate 138 is positioned above a rearward portion of the second fan 134. In this configuration, part of the free end of the handle 118 extends beyond the rear housing wall 110.

As shown in FIG. 2, the first and second fans and the handle 118 are positioned approximately in the center transversely of the assembly. As a result, the assembly is approximately balanced along the longitudinal mid-plane of the assembly, except for any load applied by the power cord 122. A power shut-off or circuit breaker 140 is on an opposite side of the handle 118 from the power cord 122. The circuit breaker 140 removes current from the lamp source when the circuit breaker is tripped.

Figure 7:
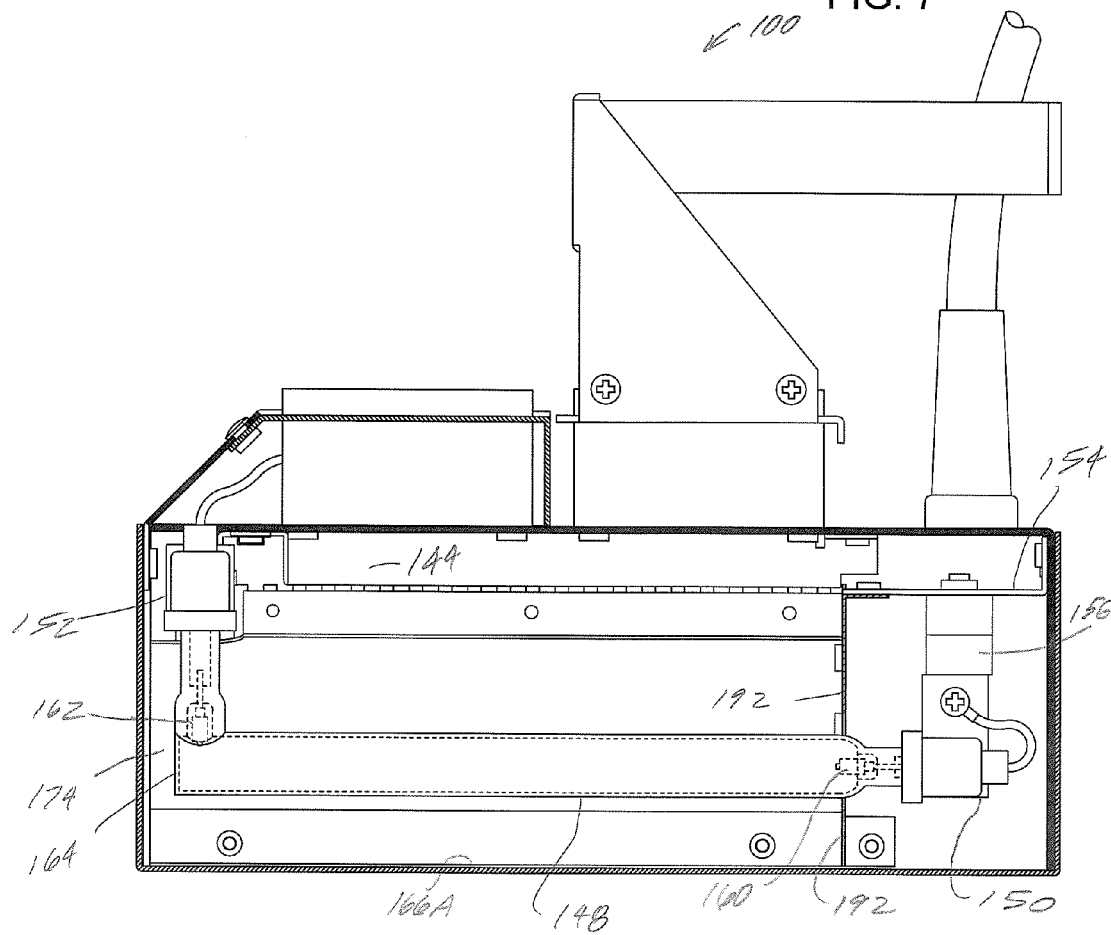
FIG. 7 is a longitudinal vertical cross-section of the assembly of FIG. 1 taken along line 7-7 in FIG. 2.
Figure 8:
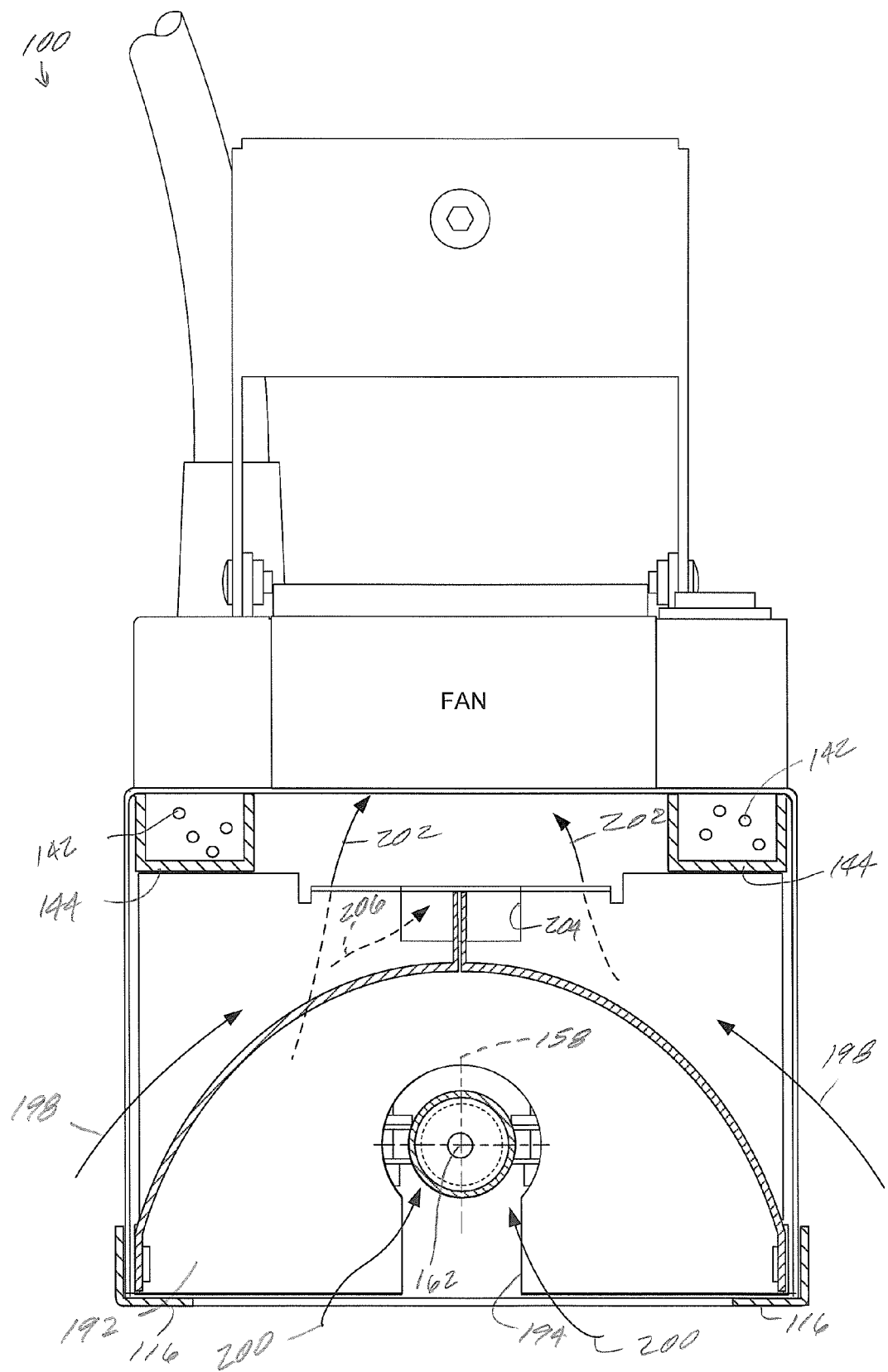
FIG. 8 is a transverse vertical cross-section of the assembly of FIG. 1 facing rearward and taken along line 8-8 of FIG. 2.

The fans and the UV curing lamp source are supplied with power from the power cord 118 through associated conductors or wires represented schematically at 142 (FIG. 8). The wires 142 extend along corresponding race ways 144 secured to the underside of the upper housing wall 114. The race ways 144 extend a substantial length of the body, as shown in FIG. 7. The race ways 144 have a rearward-facing opening for the wires to pass-through. The race ways are closed at the front, the sides and the bottoms.

A lamp source assembly 146 (FIGS. 1, 5-9 and 11-13) is positioned within the housing 104 for producing radiation such as UV radiation or other wavelength radiation as desired. In the present examples, the lamp source assembly 146 includes an axially or longitudinally extending primary bulb body 148 extending longitudinally of the irradiation body 102. As seen in FIG. 5, the lamp bulb is substantially centered width wise of the housing, and is supported in a lower portion of the body through rear and forward bulb holding brackets 150 and 152, respectively (FIG. 7). The holding brackets 150 and 152 are conventional brackets used for holding bulbs of this type. As can be seen in FIG. 7, the rearward bracket 150 is supported from a mounting plate 154 by an insulator 156. The mounting plate 154 in turn is mounted to and supported by a flange depending downward from the upper housing wall 114. The forward bracket 152 is supported from a mounting plate 158 (FIG. 9), which in turn is mounted to an underside of the upper housing wall 114. The brackets 150 and 152 securely support the lamp source assembly so that the bulb body 148 is securely positioned on a longitudinal mid-plane 158 (FIG. 8), and extends substantially horizontally when the UV curing source is placed on a horizontal surface.

In one example of a lamp source assembly 146 (FIGS. 1-13), the lamp source assembly includes a medium-pressure bulb with first and second electrodes 160 and 162, respectively. In the example shown in FIG. 11, the lamp source assembly has the first and second electrodes oriented non-parallel, and in this example at an angle to each other, and specifically in the present example perpendicular to each other. In this example, the first electrode 160 is oriented substantially parallel and coaxial with a central axis 162 of the primary bulb body 148, and a substantial portion of the length of the bulb is coaxial with the central axis. The second electrode 162 is positioned at an end of the bulb opposite the first electrode 160. In the present example, the second electrode 162 has a central axis that intersects the central axis 163 and is perpendicular to it. In this configuration, a substantial amount of radiation is emitted through the primary bulb body 148, and a portion of the radiation from the bulb is emitted from an un-obstructed end face 164. Emission from the end face is un-obstructed by the second electrode 162 as the electrode and bulb tip extend radially away from the primary bulb body 148. This helps to reduce any shadow that might otherwise occur with bulbs where the electrodes are co-linear.

Orienting the second electrode 162 perpendicular to the primary bulb body 148 also allows more desirable positioning of the bulb within the housing. For example, the end face 164 can be placed relatively close to the front of the irradiation assembly. This allows a bulb to be placed closer to the target surface while the irradiation assembly is being used. Having the second electrode perpendicular also provides more flexibility in positioning the bulb within the housing.

The housing 104 includes one or more openings to allow radiation from the bulb to be emitted from the housing. The opening is configured to provide the desired irradiation as a function of the bulb position, any reflector position and relative positions of the bulb with a reflector. In the example shown in FIGS. 6-7, the housing includes a first wall 166, including a right bottom edge 166A, a rear bottom edge 166B and a left bottom edge 166C defining a substantially rectilinear opening (in bottom profile) through the bottom housing wall 116. This rectilinear opening is a first or bottom opening 168, and the bottom opening is configured relative to the lamp source to permit radiation from the lamp source to pass through the opening. The portions of the bottom housing wall 116 adjacent the walls 166A and 166C are relatively small, providing a commensurately large bottom opening 168. In one example, the bottom opening 168 can occupy about 60% or more of the bottom surface area, in part due to the small surface areas occupied by the bottom housing wall 116, between the right bottom edge 166A and the right side wall 112, the rear bottom edge 166B and the rear wall 110, and the left bottom edge 166C and the left side wall 108. The spacing or width between the right bottom edge 166A and the right side wall 112, and between the left bottom edge 166C and the left side wall 108 is relatively small, and can be 1.3 cm or less, for example, which is small compared to an overall housing width of about 11 cm. The surface areas occupied by these walls in the bottom housing wall 116 can be further reduced, if desired, for example by reducing the surface area of the rear portion of the bottom housing wall 116.

In the example shown in FIGS. 1-9, the irradiation assembly includes a second wall 170, including a left edge 170A, a right edge 170B and a curved upper edge 170C defining a front opening 172 through the front housing wall 106. The front opening is configured in such a way that radiation can exit the housing from the lamp source through the front opening, and in the example shown in FIGS. 1-9, radiation can be emitted from both the bottom opening and the front opening. If desired, a removable cover (either internally reflective or a less reflective surface) can be placed over either or both of the bottom and front openings to selectively emit radiation in the desired direction. For example, the front opening can be covered while radiation is emitted from the bottom opening, for example to cure relatively uniform and large surfaces. The front opening can be uncovered to permit irradiation of closer surfaces or smaller surfaces, either with covering the bottom opening or leaving the bottom opening uncovered. A front cover could pivot such as on a hinge, slide, or otherwise be reliably movable. Where the end face 164 of the bulb is positioned in the housing relatively close to the plane of the front housing wall 106, the bulb can be placed relatively close to the target surface. For example, the end face 164 of the bulb can be placed within a half-inch or ¼ inch of the front wall, or less. Additionally, depending on the size of the opening 172, more or less radiation can be emitted from the front of the housing. The size and shape of the front opening may conform to the size and shape of the reflector just inside the front wall, described more fully below. For example, if a reflector has an elliptical profile, the upper wall 170C may also have an elliptical profile.

In the example shown in FIGS. 1-9, the front opening 172 is substantially perpendicular to the bottom opening 168. The openings can have other relative orientations, as desired, as well as other opening profiles.

Figure 9:
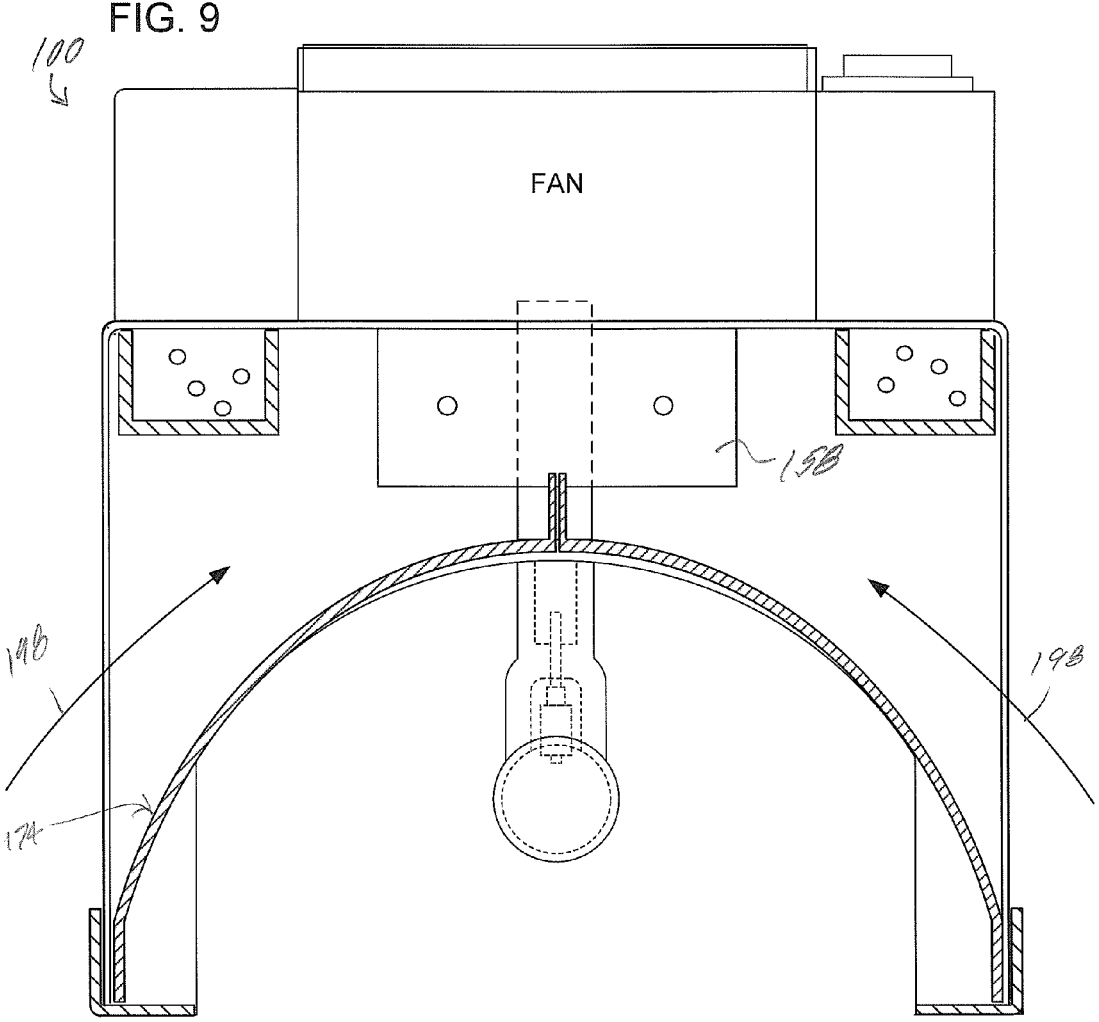
FIG. 9 is a transverse vertical cross-section of the assembly of FIG. 1 facing forwardly and taken along line 9-9 of FIG. 2.
Figure 10:
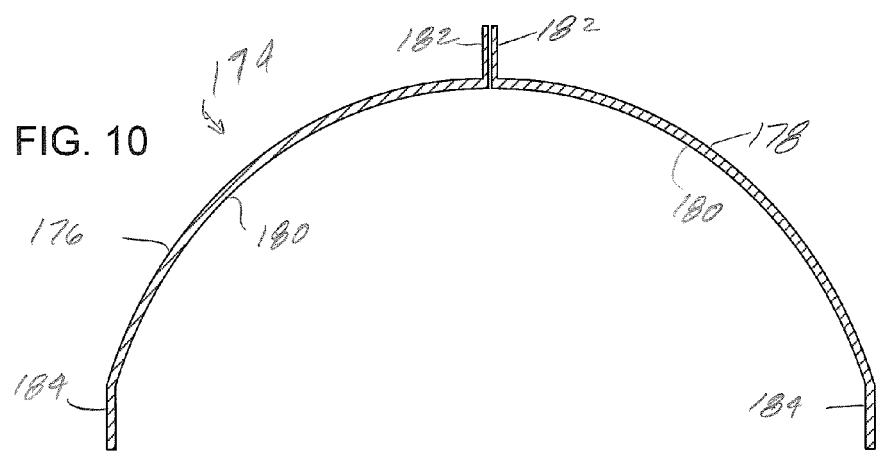
FIG. 10 is a transverse vertical cross-section of a reflector assembly that can be used in the assembly of FIG. 1.
Figure 11:
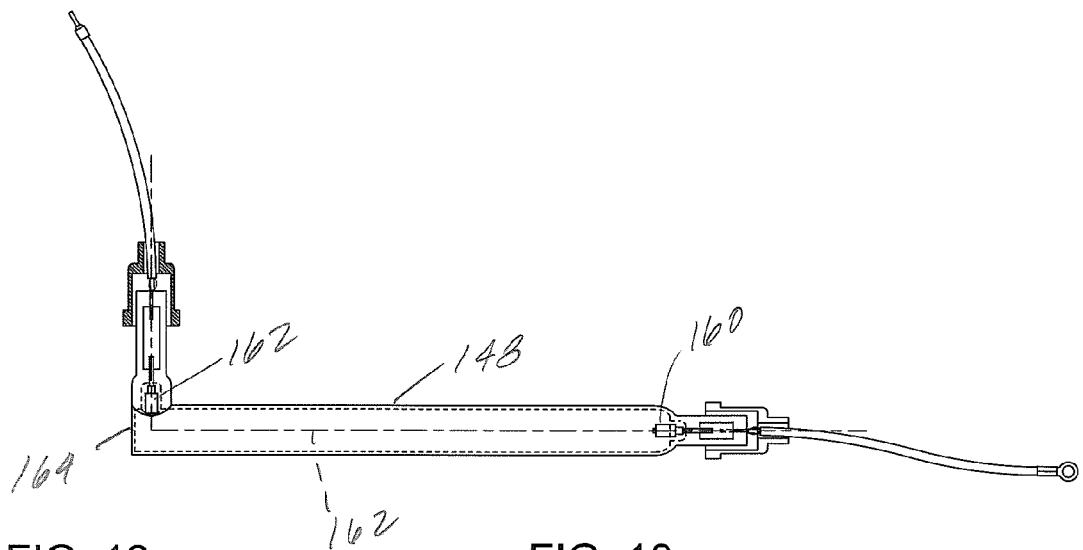
FIG. 11 is a side elevation view of a lamp bulb or source assembly that can be used in the assembly of FIG. 1.
Figure 12:
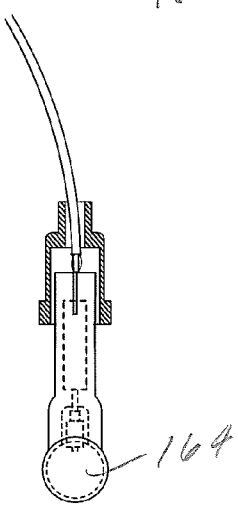
FIG. 12 is a front elevation view of the lamp source of FIG. 11.
Figure 14:
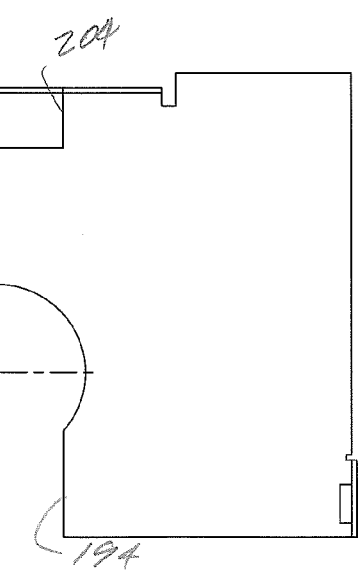
FIG. 14 is a rear elevation view of a reflector for use in the assembly of FIG. 1.
Figure 15:
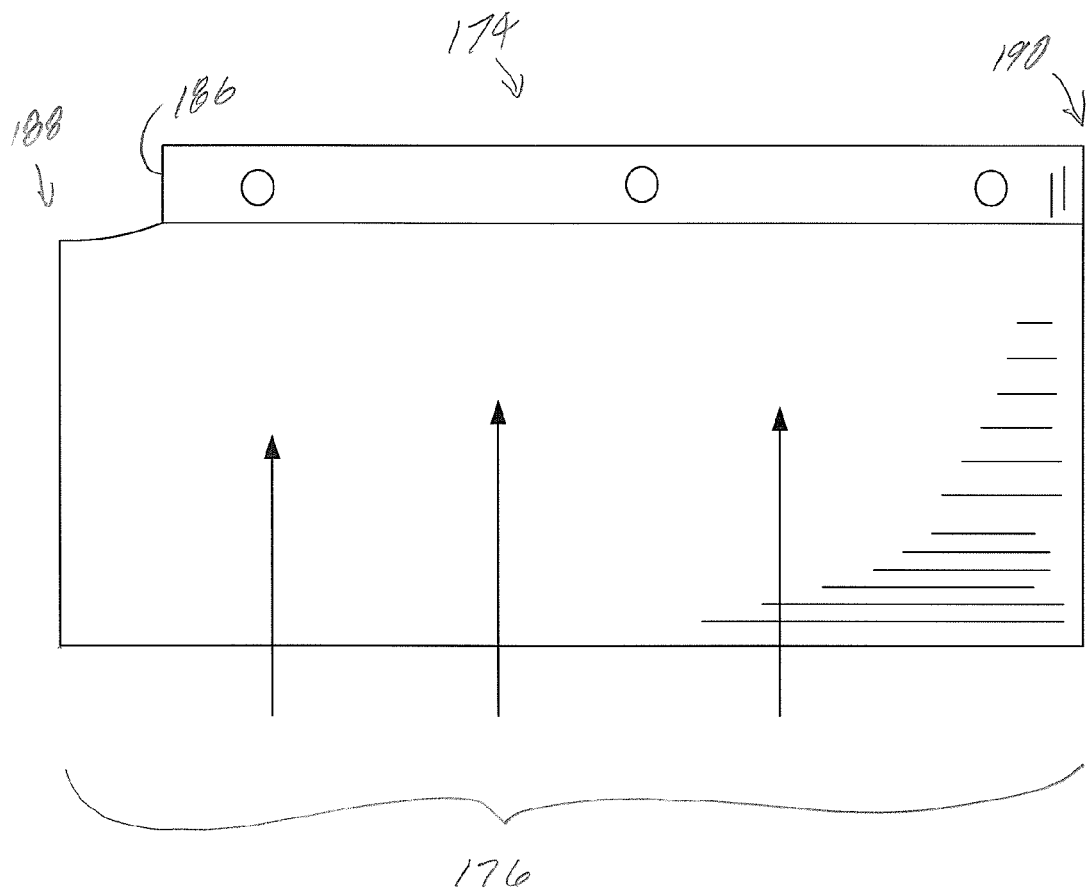
FIG. 15 is a side elevation view of the reflector assembly of FIG. 10.

One or more reflectors are typically used with irradiation devices. In the present example, a reflector assembly 174 (FIGS. 6-10) includes a linear portion 176 (FIG. 15). In the present configuration, the linear portion 176 extends longitudinally substantially parallel to the lamp source primary body 148. The reflector 174 is positioned inside the housing 104 to reflect radiation from the lamp source. In the exemplary configuration, the reflector 174 is formed from a pair of substantially identical and oppositely facing reflector portions, each of which have a profile of approximately ¼ of an ellipse. As shown in FIG. 10, the reflector assembly is formed from a first reflector segment 176 and a second reflector segment 178. Each has an arcuate segment 180 having an elliptical profile. One end of each segment terminates in a respective flange 182 butted up against each other and secured together, for example through fasteners. Each segment also includes a substantially planar segment 184 extending the length of each segment, to help anchor the reflector segment 176 or 178 to the adjacent side wall, for example through fasteners. As shown in FIG. 15, the flanges 182 terminate at a front end 186 to provide space for the second electrode and its respective insulator. Otherwise, the flanges 182 extend the entire length of the reflector 174.

Figure 6:
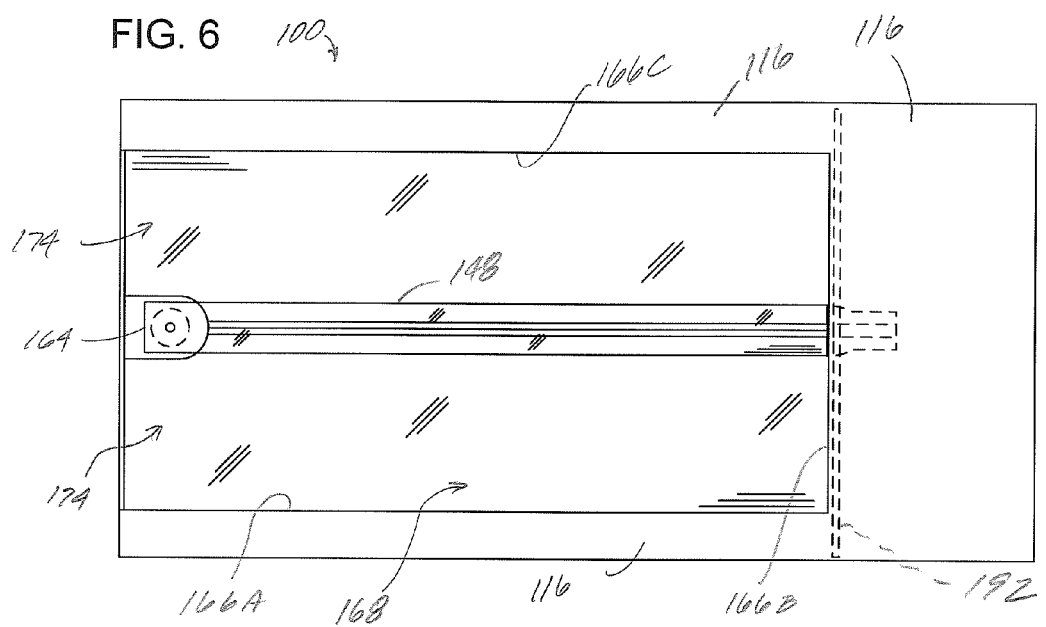
FIG. 6 is a bottom plan view of the assembly of FIG. 1.

As shown in FIG. 15, the reflector 174 includes first and second end portions 188 and 190, respectively. The reflector 174 is positioned (FIG. 7) relative to the lamp source to have the first and second reflector segments 176 and 178, respectively, parallel to the primary lamp source body 148. As shown in FIGS. 6 and 7 and 15, the first end portion of the reflector is open and adjacent the front opening 172 so that radiation can be emitted from the front opening 172. In the exemplary configuration, there is no front reflector, thereby allowing radiation to exit the front of the assembly. In another configuration where a removable or movable cover is included, radiation can be selectively allowed to exit the front of the assembly.

The reflector assembly 174 has a substantially constant cross-section profile from the first end 188 to the second end 190, namely approximating elliptical surfaces. Therefore, the middle portion of the reflector 174 and the end profile of the reflector 174 at the first end 188 are substantially identical. In the present example, the lamp and reflector combination produce a substantially line form of radiation at the focal point of the reflector for curing a target surface. Also, as a result of the reflector extending substantially linearly with a relatively constant cross sectional profile, there is no reflector portion at the first end 188 obstructing radiation from exiting the front opening 172. Therefore, radiation passing parallel to the reflector can pass beyond the first end portion and outside the housing. In other configurations, movable or removable covers or reflectors can be included at the front opening.

In the present example, the assembly includes a further reflector element 192 (FIGS. 5-8 and 14). The further reflector element 182 is a second reflector and is positioned and configured to be non-parallel to the reflector 174 and non-parallel to the primary lamp source body 148. The second reflector element is substantially flat in the exemplary configuration and extends width-wise between the left and right housing walls and substantially the entire width of the first reflector 174. In the present orientation, the second reflector 192 faces the front opening 172 and includes an opening 194 (FIG. 5) extending around the lamp source approximately at the position of the first electrode 160 (FIG. 7). The reflector 192 is secured to the mounting plate 154 and to the left and right housing side walls to reliably hold the reflector 182 in place. The reflector may also take other shapes and orientations, for example to produce the desired radiation flux distribution at the front opening.

Irradiating assemblies, including hand-held assemblies, can include fluid flow openings in one or more side walls to help cool components of the assembly. As shown in FIGS. 1 and 4, a plurality of openings 196 are formed in the left side wall 108 (and an identical number and configuration of openings are formed in the right side wall 112) to allow air flow or other fluid flow through the openings. Air flowing through the openings pass between the first and second reflector segments and the adjacent side walls, as shown in FIGS. 8 and 9 at 198. Where the first and second fans pull air through the openings 196, the air flow is as depicted by the arrows, whereas if the fans push air, the air will flow in the opposite directions. For the present discussion, it will be assumed that the fans pull air in.

The plurality of openings 196 are substantially long narrow openings extending vertically on the side walls. The openings are separated into upper and lower banks of openings, each opening being the same size and configuration as the others. However, a variety of opening configurations can be used. In the exemplary side walls, the aggregate open space occupied by co-linear pairs of openings occupies at least half the height of the side wall. Additionally, the front to back span of each bank of openings extends substantially the length of the reflector portions. As a result, air flows substantially over the entire surface of each reflector segment.

As shown in FIG. 8, the fans will pull air through available openings. For example, air will flow from within the trough of the reflector segments through the reflector opening 194, as indicated by the arrows 200. This air will flow behind the flat reflector 192 and around the bulb surrounding the first electrode. Air will also flow from behind the second reflector 192 and up to the fan, as indicated by the arrows 202. Air from behind the flat reflector 192 will also be pulled through the opening 204 in the flat reflector as indicated at arrow 206. Other flow configurations are also possible, depending on internal structures and passage ways.

During use, irradiating assemblies, including the examples described herein, can be used to irradiate surfaces. According to several methods, including those that can be used with the apparatus described herein, uniform surfaces such as walls, floors and ceilings can be irradiated, and corners between adjacent walls and between adjacent walls and ceilings or floors can also be irradiated. For example, the assembly 100 can be used to irradiate large and/or relatively uniform surfaces such as walls 208 and 210 (FIGS. 16 and 17) as well as floors or ceilings. A floor 212 is represented in the drawings. During one process, the assembly 100 can be positioned so as to direct radiation toward the wall 208, to irradiate the surface with radiation emitted from the bottom opening 168. The coating or other material on the wall 208 can be cured by passing (as indicated by the arrow 214) the irradiating assembly 100 over the surface of the wall at the distance or spacing necessary and at the speed necessary to properly cure the material.

Figure 16:
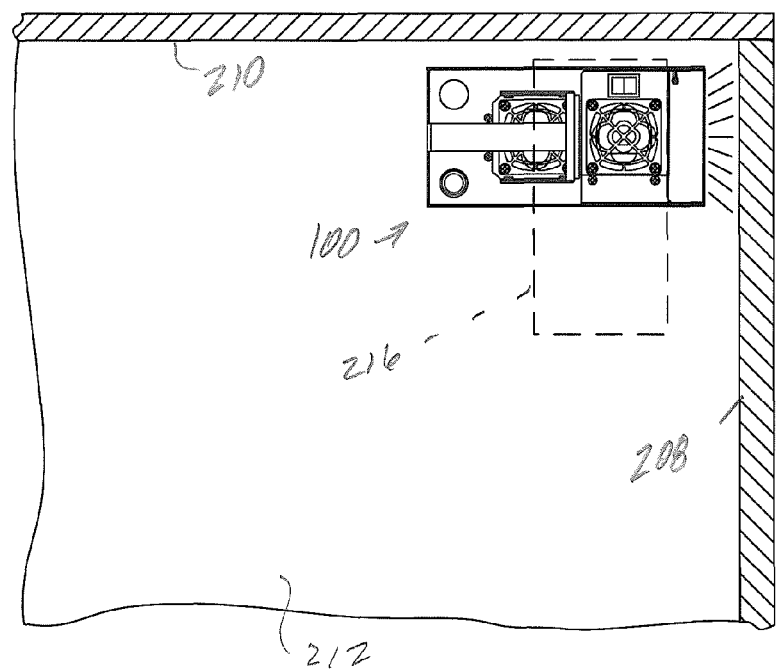
FIG. 16 is a schematic and partial section of a top plan view of a plurality of walls and depicting use of an assembly such as that shown in FIG. 1 for curing a corner.
Figure 17:
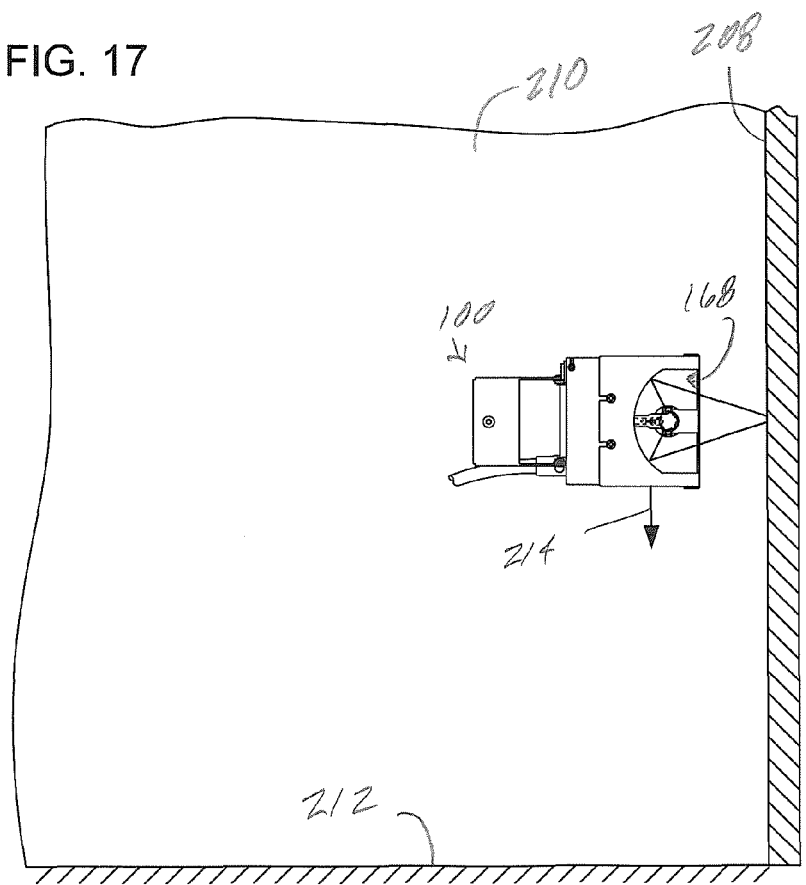
FIG. 17 is a schematic and partial section of a side elevation view of a plurality of walls and depicting use of an assembly such as that shown in FIG. 1 for curing a surface.

Substantial portions of the wall and floor or ceiling surfaces can be cured in this manner. In two-wall corners, or in three-surface corners, the length of the irradiating assembly ordinarily might inhibit proper curing of the material. However, by irradiating close surfaces with radiation emitted from the front opening 172, those surfaces can be more easily irradiated and cured. For example, as represented in FIG. 16, the assembly 100 is positioned close to the wall 208 so as to irradiate the surface with radiation emitted through the front opening 172. Because the front face 164 of the lamp source is close to the plane of the front opening 172, radiation is easily applied to the surfaces immediately outside the front opening. The assembly can then be moved up and down the wall to continue curing the material. The assembly 100 can then be moved, for example to the orientation represented by 216, for curing the adjacent corner surface. Similar steps can be followed for ceilings and floors.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A UV curing irradiator comprising:
   a body including a housing extending longitudinally;
   a handle on the body configured to permit holding the irradiator and to permit moving of the irradiator to a desired orientation;
   at least one wall defining at least one opening in the housing configured to permit UV radiation from a lamp source to pass through the opening; and
   at least one UV reflector having a first portion with side portions extending longitudinally in the housing, wherein the side portions extend to respective longitudinally extending sides of the housing and wherein at least a part of the first portion of the reflector faces at least part of the opening in the housing, the at least one reflector having first and second end portions, and wherein the at least one reflector includes a second portion non-parallel to the side portions and wherein the first end portion of the reflector is open and an adjacent portion of the housing is open and wherein at least part of the second non-parallel portion of the reflector faces the open first end portion of the reflector.

2. The apparatus of claim 1 wherein the at least one UV reflector extends longitudinally and has an at least partly elliptically profiled reflector portion.

3. The apparatus of claim 2 wherein the partly elliptically profiled reflector is unperforated over the elliptical profile except at the first end portion of the reflector.

4. The apparatus of claim 1 wherein the side portions of the first portion of the UV reflector are substantially flat and fastened to the housing.

5. The apparatus of claim 1 wherein the UV reflector is formed from two halves.

6. The apparatus of claim 1 wherein the at least one wall defining at least one opening is a wall in a bottom of the housing opposite the handle, and wherein the wall defines an at least partly-rectangular opening.

7. The apparatus of claim 6 wherein the at least one wall includes a second wall extending along a side portion of the housing and forming a second opening adjacent the first end portion of the reflector that is open.

8. The apparatus of claim 7 wherein the second wall includes a portion adjacent the elliptical portion of the elliptically-profiled reflector.

9. The apparatus of claim 7 wherein the second wall extends in a plane perpendicular to the bottom of the housing.

10. The apparatus of claim 9 wherein the second wall extends in a plane and wherein the second portion of the at least one reflector is parallel to the second wall.

11. The apparatus of claim 10 wherein the second portion of the at least one reflector is substantially planar.

12. The apparatus of claim 1 further including a UV lamp source extending longitudinally within the housing between the at least one UV reflector and the at least one opening in the housing.

13. The apparatus of claim 12 wherein the UV lamp source has a first portion extending longitudinally, and a second portion extends adjacent the open first end portion of the reflector.

14. The apparatus of claim 13 wherein the first portion of the UV lamp source extends perpendicular to the second portion of the UV lamp source.

15. The apparatus of claim 13 wherein the first portion of the UV lamp source extends through the second non-parallel portion of the reflector, and wherein the second portion of the UV lamp source extends through the first portion of the reflector.

16. A method of curing a UV curable material using a handheld UV irradiation lamp assembly, the method comprising:
    positioning a handheld UV irradiation lamp assembly so as to direct UV radiation toward a surface from a first portion of the assembly;
    irradiating a surface with radiation emitted from the first portion of the assembly;
    positioning the assembly so as to direct UV radiation toward a surface from a second portion of the assembly from which radiation had not come during the directing of UV radiation from the first portion of the assembly at the time of directing from the first portion; and
    irradiating a surface with radiation emitted from the second portion of the assembly.

17. The method of claim 16 further including reflecting UV radiation on an elliptically-profiled reflector through the first portion of the assembly.

18. The method of claim 17 further including reflecting UV radiation on a flat reflector through the second portion of the assembly.

19. The method of claim 16 further including moving air across a surface of a UV reflector on a side of the UV reflector opposite a UV lamp.

20. The method of claim 16 further including moving a movable cover to change the ability of UV radiation to be directed from the second portion of the assembly.

21. An apparatus for producing UV radiation comprising a housing extending longitudinally and having a bottom with an opening in the bottom and a side with an opening in the side, a handle on a manually accessible portion of the body configured to permit holding the apparatus and to permit moving of the apparatus to a desired orientation, a UV lamp source within the housing for producing UV radiation, a first UV reflector having a first portion extending parallel to a first portion of the UV lamp source, a second UV reflector extending non-parallel to the first UV reflector, wherein UV radiation from the first UV reflector can pass through the opening in the bottom, and wherein UV radiation from the second UV reflector can pass through the opening in the side.

* * * * *